(12) United States Patent
Jeon (10) Patent No.: US 12,519,785 B2
(45) Date of Patent: Jan. 6, 2026

(54) NETWORK SECURITY MANAGEMENT SYSTEM AND MANAGEMENT SERVER FOR CONTROLLING DISPOSABLE DRUG INJECTOR

(71) Applicant: IPV, Seoul (KR)

(72) Inventor: Ho Min Jeon, Yongin-si (KR)

(73) Assignee: IPV, Seoul (KR)

( * ) Notice: Subject to any disclaimer, the term of this patent is extended or adjusted under 35 U.S.C. 154(b) by 286 days.

(21) Appl. No.: 18/228,728

(22) Filed: Aug. 1, 2023

(65) Prior Publication Data

US 2023/0379329 A1 Nov. 23, 2023

Related U.S. Application Data

(63) Continuation of application No. PCT/KR2022/004999, filed on Apr. 7, 2022.

(30) Foreign Application Priority Data

Jun. 17, 2021 (KR) .................. 10-2021-0078438

(51) Int. Cl.
*H04L 9/40* (2022.01)
*G16H 20/17* (2018.01)
*G16H 40/67* (2018.01)

(52) U.S. Cl.
CPC ......... *H04L 63/0876* (2013.01); *G16H 20/17* (2018.01); *G16H 40/67* (2018.01); *H04L 63/083* (2013.01); *H04L 63/108* (2013.01)

(58) Field of Classification Search
CPC . H04L 63/0876; H04L 63/083; H04L 63/108; H04L 63/0428; H04L 63/08; H04L 63/10; H04L 65/40; G16H 20/17; G16H 40/67; G16H 40/63; G16H 40/40; G16H 10/60
See application file for complete search history.

(56) References Cited

U.S. PATENT DOCUMENTS

| 10,341,866 B1 | 7/2019 | Spencer et al. |
| 2003/0127508 A1* | 7/2003 | Jones .................. G06Q 10/087 235/375 |

(Continued)

FOREIGN PATENT DOCUMENTS

| JP | 2006122608 A | 5/2006 |
| JP | 2012510684 A | 5/2012 |

(Continued)

*Primary Examiner* — Khoi V Le
(74) *Attorney, Agent, or Firm* — Dinsmore & Shohl LLP; Yongsok Choi, Esq.

(57) ABSTRACT

Provided is a network security management system and management server for controlling a disposable drug injector. A method of controlling a disposable drug injector by using a drug injector controller includes searching for a nearby device for connecting to a disposable drug injector, authenticating that a found device is the disposable drug injector that is controllable by the drug injector controller, requesting, from the disposable drug injector, to set a data accessing authority and a device controlling authority, and controlling the disposable drug injector in which the data accessing authority and the device controlling authority are set via network communication.

7 Claims, 5 Drawing Sheets

(56) References Cited

U.S. PATENT DOCUMENTS

2006/0122608 A1* 6/2006 Fallin ................ A61B 17/0401
                                                    606/328
2008/0164275 A1* 7/2008 Poutiatine ............. G16H 20/13
                                                    128/200.14
2020/0020444 A1* 1/2020 Furuichi ................ G16H 40/67

FOREIGN PATENT DOCUMENTS

| KR | 1020110103959 A | 9/2011 |
| KR | 1020130045982 A | 5/2013 |
| KR | 1020160064934 A | 6/2016 |
| KR | 1020180078804 A | 7/2018 |
| KR | 101886334 B1 | 8/2018 |
| WO | 2020009751 A1 | 1/2020 |

* cited by examiner

NETWORK SECURITY MANAGEMENT SYSTEM AND MANAGEMENT SERVER FOR CONTROLLING DISPOSABLE DRUG INJECTOR

CROSS-REFERENCE TO RELATED APPLICATIONS

This application is a continuation of International Application No. PCT/KR2022/004999 filed on Apr. 7, 2022, which claims priority to Korean Patent Application No. 10-2021-0078438 filed on Jun. 17, 2021, the entire contents of which are herein incorporated by reference.

TECHNICAL FIELD

The present disclosure provides a network security management system and management server for controlling a disposable drug injector.

RELATED ART

According to the related art, smart health care services, etc. using Internet of Things (IoT) and wearable devices have been spread in wide variety of fields, and related industries have explosively grown. Moreover, a lot of needs have recently occurred in the fields such as medical devices and medical prescription support which deal with sensitive individual information, and accordingly, sensitivity in dealing with privacy information has been increasing.

In particular, in the case of certain diseases that need continuous follow-ups with respect to the patient's condition and maintenance with respect to the prescription from medical institutions, it is very important to secure service continuity and safety.

In addition, medical devices may be defined as mechanism, machines, devices, materials, software, or similar products that may be used solely or in combination with each other with respect to human beings or animals, and the medical devices are required to comply with related standards under stricter references than general health care support devices and to get authentication about specifications thereof from a reliable organization.

Examples of international standards regarding information security include ISO 27001 and ISO 27701. ISO 27001 and ISO 27701 are world's most authoritative authentication in the field of standards for information security management established by International Organization for Standardization (ISO). According to ISO 27001, information is regarded as an asset, and requirements for maintaining confidentiality, integrity, and availability thereof include 133 controls in 11 domains including security policy, security organization, asset classification and control, human security, physical and environmental security, communication and operation management, access control, system introduction, development, and repairment, security incident management, business continuity plan, compliance, etc.

For acquiring authentication of the above standards ISO 27001 and ISO 27701, it is necessary to pass all strict screening processes about information protection management, e.g., information protection policy, physical security, access control, legal compliance, etc. from ISO-certified authentication agencies.

Although all the companies (or organizations) dealing with sensitive information do not need to get the authentication of the above standards, when a company (or organization) is able to manufacture a medical device complying with the above standards, it may denote that the company has standardized and safe information management system. Thus, reliability from consumers may be improved and international product competitiveness satisfying the global standards may be obtained.

SUMMARY

Technical Problem

The present disclosure provides a network security management system and a management server capable of implementing an information protecting management system complying with above international standards ISO 27001 and ISO 27701, and in particular, capable of controlling a disposable drug injector through a network communication method. However, the technical goal of the present disclosure is not limited thereto, and other technical goals may be inferred from the following embodiments.

Technical Solution

According to an embodiment of the present disclosure, a method of controlling a disposable drug injector by using a drug injector controller includes searching for a nearby device for connecting to a disposable drug injector, authenticating that a found device is the disposable drug injector that is controllable by the drug injector controller, requesting, from the disposable drug injector, to set a data accessing authority and a device controlling authority, and controlling the disposable drug injector in which the data accessing authority and the device controlling authority are set via network communication.

Here, the authenticating of that the found device is the disposable drug injector controllable by the drug injector controller may include encoding exclusive controller authentication data and transmitting the encoded exclusive controller authentication data to the found device, receiving encoded signature information from the found device, and decoding and authenticating the encoded signature information.

Here, the encoded signature information may include a feature value of the drug injector, and one or more encryption keys from a personal key, a public key, and a secret key for security authentication.

Also, the requesting of the setting of the data accessing authority and the device controlling authority from the disposable drug injector may include, except for an exceptional control through a management server, an exclusive authority to control one or more of sensing data, drug injection time, an injection amount, and drug injection history of the disposable drug injector only by the drug injector controller.

Also, the method of controlling the disposable drug injector by using the drug injector controller may further include transferring to the management server status information notifying that the drug injector controller is bonded to the disposable drug injector as an exclusive controller, and transferring to the drug injector a management server public key received from the management server.

According to another embodiment, a disposable drug injector controller includes a communication module performing wireless network communication, a security module encoding or decoding data transmitted/received through the communication module, an authentication module generating exclusive controller authentication data, and authenticating a device sending signature information by checking the signature information received from another device, and a processor configured to support a device searching mode in which a nearby device is searched for in order to connect to a disposable drug injector, and to perform settings of a data accessing authority and a device controlling authority with respect to the authenticated device and control of the device that is authorized.

According to another embodiment, a method of controlling a disposable drug injector by using a temporary controller, includes logging-in, performed by a user terminal, to a health care service platform, approving, performed by a management server, a drug injector temporary control authority requested by the temporary controller, and generating temporary controller authority information that is authenticated by a personal key of the management server, sending, performed by the user terminal, an access request to a drug injector based on the temporary controller authority information, searching for, performed by the drug injector, an exclusive controller connected thereto in vicinity and switching to a temporary controller usage mode or a replacement controller usage mode according to a search result, requesting, performed by the user terminal, to generate a command for controlling the drug injector via the health care service platform, checking, performed by the management server, the command for controlling the drug injector transmitted from the user terminal by using a personal-customized health care service model, and generating an appropriate command for controlling the drug injector, and controlling, performed by the user terminal, the drug injector by using the command for controlling the drug injector received from the management server.

According to another embodiment, a health care service platform management server for controlling a disposable drug injector, includes an authentication module authenticating personal information and device information, and authenticating an accessing authority to requested data, a security module encoding or decoding transmitted/received data and setting a data accessing authority according to a data classification system, a processor configured to manage a drug injector and an exclusive controller and to approve a controller temporary usage authority based on a personal-customized health care service model, and a communication module performing a network communication.

Advantageous Effects of Disclosure

When a company providing a personalized service recognizes information as an asset, establishes a classification system for sensitive information, and manages an accessing authority thereof, following effects are obtained.

First, bonding a connection between a disposable drug injector and an exclusive controller according to an embodiment of the present disclosure and allowing the exclusive controller to exclusively control the corresponding disposable drug injector guarantee that sensitive information is safely managed. For example, when a diabetic patient gets an insulin injection prescription from a medical institution and the prescription is redundantly injected through another device or is injected through an unreliable device, it may lead to a medical malpractice. Also, according to characteristics of a disposable drug injector, registration of use and discard of a device frequently occur because a disposable drug injector is discarded when a certain time period has passed and a new disposable drug injector is used. An exclusive controller may allow the registration, use, and discard of a plurality of disposable drug injectors to be stably provided.

Second, there may be various situations in which the corresponding exclusive controller may not be used in view of durability and safety of the service. In the above situations, an authority to use a temporary controller or a replaceable controller is granted so that the corresponding service may be managed in real-time, and the risk that may occur when the drug is not injected to the patient in time may be reduced.

Third, drug injection history information of the patient may be unitarily managed through a management server. In an embodiment, when an insulin injection history, time, and pre- and post-management are recorded in a cloud server for each patient, the patient may get individual feedback information with respect to the insulin injection history, and may be also provided with appropriate report with respect to health condition of the patient and health improvement. Also, the cloud server establishes big-data by collecting data about various cases of the patients to find meaningful medical clinic examples, and may use the big-data in adaptive model learning and service improvement.

DETAILED DESCRIPTION

The present disclosure provides a network security management system and management server for controlling a disposable drug injector. According to an embodiment of the present disclosure, a method of controlling a disposable drug injector by using a drug injector controller includes searching for a nearby device for connecting to a disposable drug injector, authenticating that a found device is the disposable drug injector that is controllable by the drug injector controller, requesting, from the disposable drug injector, to set a data accessing authority and a device controlling authority, and controlling the disposable drug injector in which the data accessing authority and the device controlling authority are set via network communication.

MODE OF DISCLOSURE

Hereinafter, one or more embodiments of the disclosure will be described in detail with reference to accompanying drawings to the extent that one of ordinary skill in the art would be able to carry out the disclosure. However, the disclosure may be implemented in various manners, and is not limited to the embodiment of the disclosure described herein. In addition, components irrelevant with the description are omitted in the drawings for clear description, and like reference numerals are used for similar components throughout the entire specification.

Throughout the specification, it will be understood that when an element is referred to as being "connected" to another element, it may be "directly connected" to the other element or "electrically connected" to the other element with intervening elements therebetween. It will be further understood that when a portion is referred to as "comprising" another component, the portion may not exclude another component but may further comprise another component unless the context states otherwise.

The disclosure will be described in detail below with reference to accompanying drawings.

Figure 1:
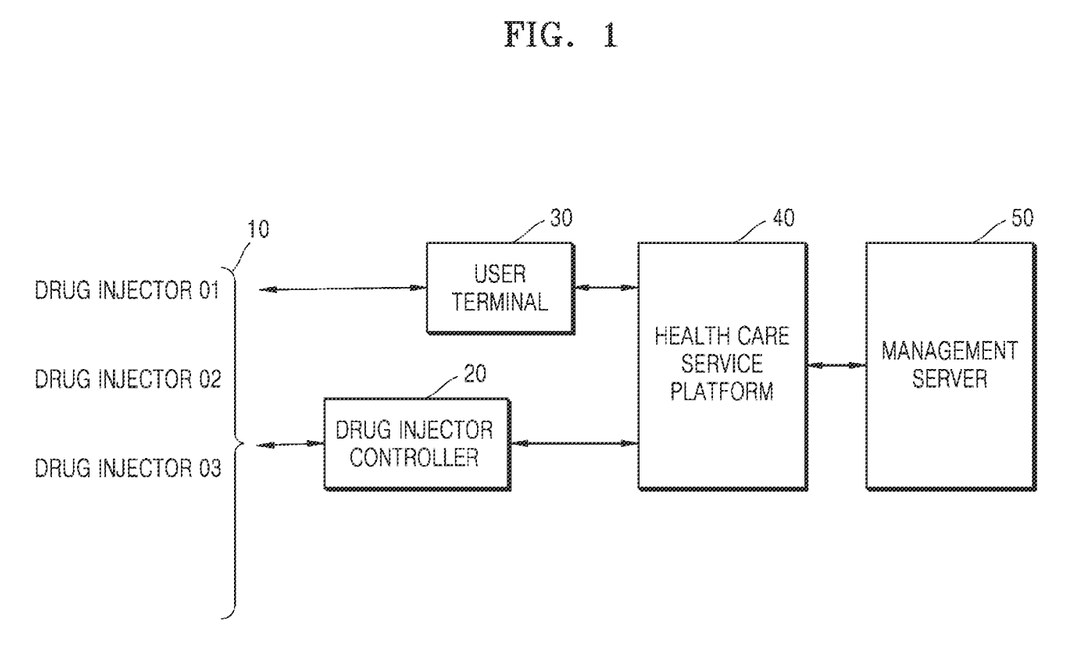
FIG. 1 is a diagram showing a network security management system for controlling a disposable drug injector according to an embodiment.

FIG. 1 is a diagram showing a network security management system for controlling a disposable drug injector according to an embodiment.

The present invention provides a network security management system for implementing a wearable drug transfer solution by using a smart medical device. Here, a medical device denotes a product approved as a medical device by the Ministry of Food and Drug Safety, and some components necessary for implementing the present disclosure satisfy the above classification as the medical device.

According to an embodiment, a drug injector 10 is a wearable device that may be attached or adhered to the user's body. The drug injector 10 may be manufactured as a wearable band or a patch-type that may be attachable/detachable, and the attachment type may be modified in various ways. The drug injector 10 of the present disclosure has a needle for injecting the drug, and thus, has to be frequently replaced due to hygienic issue. In addition, the drug injector 10 may be disposable. Alternatively, in an alternative embodiment, the drug injector 10 may be manufactured so that only some elements (e.g., needle) of the drug injector 10 may be replaceable.

The drug injector 10 may be used in various usages according to a kind of the injected drug. For example, the drug may include insulin-based drugs for diabetics, and may include other drugs for pancreas, drugs for heart, and other various types of drugs.

Here, a controller exclusively used for each drug injector 10 may be set. Hereinafter, international standards with respect to information security management system and personal information security management system will be described briefly, and setting of an exclusive controller and data sending/receiving system through network according to the present disclosure will be described below. The international standard ISO 27001 (information security management system) is an international standard with specifications for implementing information security management system (ISMS), and may be audited by an independent certification authority (CB) in a way of evaluating whether the requirements of the standard are complied. A first global international standard ISO 27701 (personal information security management system) related to personal information includes specific requirements regarding establishment of privacy information management system (PIMS), goals, and management units. ISO 27701 is an expanded standard of ISO 27701 (information security management system) and is configured to only add requirements regarding privacy information security to ISO 27001.

The embodiments of the present disclosure carry out management, access control, encrypting of privacy information according to information security policies that the present company has, and the present company has received authentication of above international standards ISO 27001 and ISO 27701.

Referring to FIG. 1, a drug injector controller 20 according to an embodiment of the present disclosure may be connected to a plurality of drug injectors 10. Here, the drug injector controller 20 may register and cancel the connection of each drug injector 10, set a usage period, or change a mode of the drug injector 10 into an activation/inactivation, etc.

According to an embodiment, the drug injector controller 20 may be called as a smart controller (advanced diabetes manager (ADM)). Here, the smart controller may remotely control the drug injector 10 via a wireless communication method, and may have a function of storing an amount of the drug to be injected, an injection time, injection history, etc. Here, in addition to the embodiments described herein, the drug injector controller 20 may be implemented in various types, and the drug injector controller 20 according to the present disclosure is not limited thereto.

The drug injector controller 20 may be exclusively connected to each drug injector 10, and if necessary, may operate as a temporary controller.

Referring to FIG. 1, a user terminal 30 may transfer personal information of a user, prescription content provided to a patient, etc. via a health care service platform. For example, the user terminal 30 may include a smart phone, a wearable device, a PC, a laptop computer, etc., and other various devices may be used as the user terminal 30.

A health care service platform 40 provides a unit for providing the user with customized service, and may be implemented as an application or SW. The health care service platform 40 may communicate with a management server 50 to read personal information, device information, data access authority, access history, etc. recorded on the management server 50, and may exchange various information that may be communicated with the user.

According to an embodiment, the health care service platform 40 may provide the user-customized service via a service model, when bio-information of the user is transferred thereto via the wearable device. For example, the health care service for the diabetics may regularly receive blood glucose level information of the user via the wearable device, and may perform functions of calculating a drug injection time and injection amount for the current user, providing health information or feedback on lifestyle based on diet information recorded by the user, etc. In addition, the health care service may provide functions of managing user-customized medical data and maintaining connected devices. Here, the execution method may be implemented variously, and thus, there may be a plurality of examples other than the examples provided in the embodiment.

Referring to FIG. 1, the management server 50 may include a processor, etc. configured to establish information security policies regarding the service provided from the health care service platform 40, and to perform managing and execute physical and technical information security policies. The management server 50 may store and manage information that is necessary to drive the health care service platform 40, and may assign multi-security level to each piece of information according to information classification system. The information to which the security level is assigned may be available only to the accesses that satisfy references and regulations. The configuration of the management server 50 will be described later with reference to FIG. 5.

In an embodiment, the management server 50 may be a subject for driving the health care service platform 40. Here, the management server 50 may be a virtual private server in the form of a cloud server, and is not limited to a physical server. Likewise, the management server 50 may be implemented through a virtual machine (VM), a VirtualBox, etc. provided that the functions described herein may be implemented.

Figure 2:
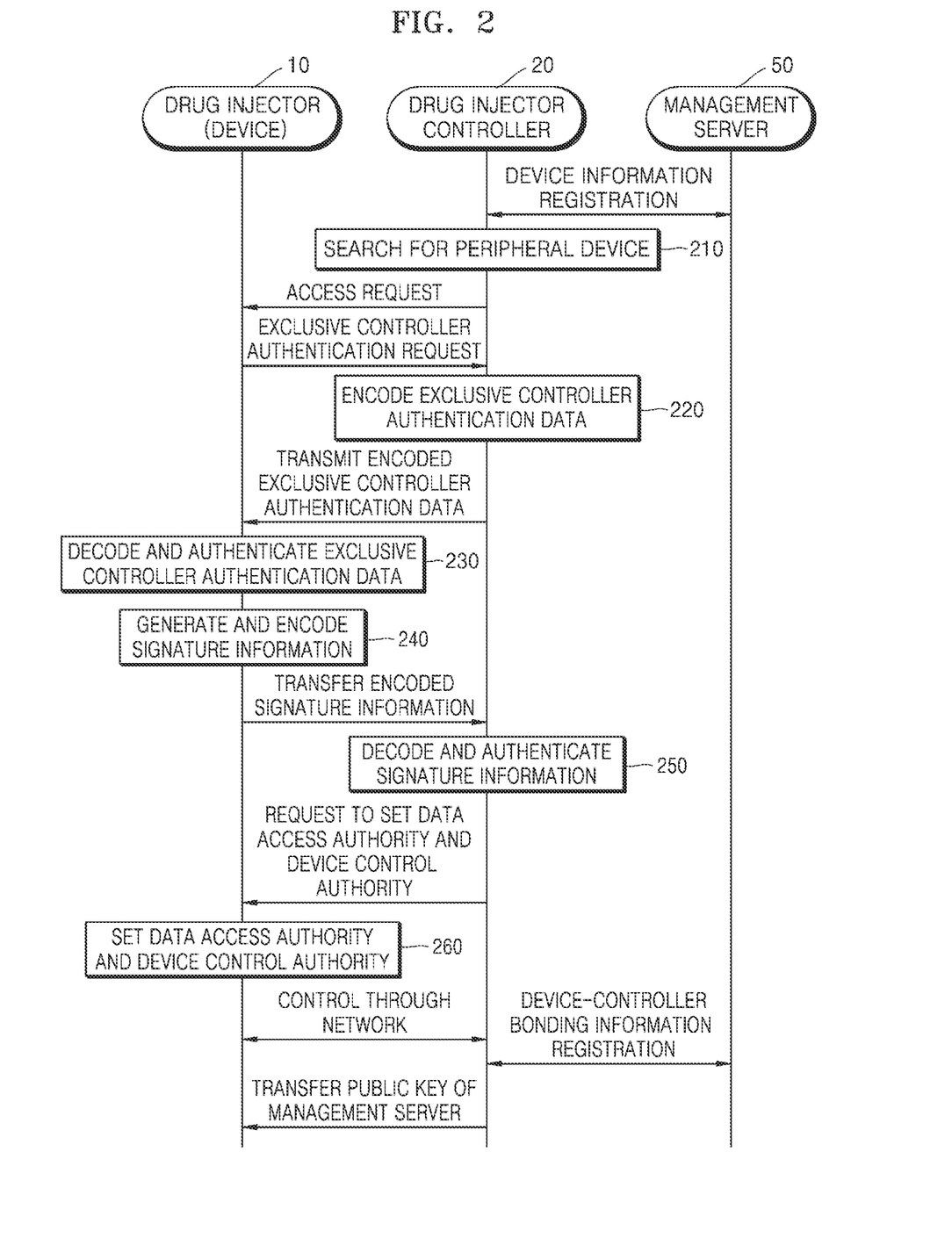
FIG. 2 is a flowchart illustrating a method of controlling a disposable drug injector by using an exclusive controller according to an embodiment.

FIG. 2 is a flowchart illustrating a method of controlling a disposable drug injector by using an exclusive controller according to an embodiment.

Referring to FIG. 2, the drug injector controller 20 may be directly connected to the drug injector 10 and control the drug injector 10, and may transfer to the management server 50 the registration of the drug injector 10, whether the drug injector 10 and the drug injector controller 20 are bonded to each other, history of performing drug injector functions, data about authentication/security of the drug injector, etc.

According to an embodiment, the drug injector controller 20 may use one or more of a short-range wireless communication network such as Bluetooth, Wi-Fi, ZigBee, etc., and a mobile communication network. For example, when a communication module of the drug injector controller 20 supports Bluetooth function, the drug injector controller 20 may perform packet communication or data/sound communication with a device within a set short-range. Here, a plurality of devices may be grouped to form a network, and then, a total capacity may be appropriately distributed among the devices as necessary.

According to an embodiment, the drug injector controller 20 may perform a function of searching for nearby devices and connecting the devices. For example, the drug injector controller 20 may search for a nearby device for connecting to a disposable drug injector (210). That is, the drug injector controller 20 scans whether there is a device in the vicinity, and then, sends a connection request to a found device. The drug injector 10 may request for exclusive controller authentication in order to identify the device sending the connection request, and the drug injector controller 20 may encode and send exclusive controller authentication data (220). Here, the exclusive controller authentication data may include encryption data of at least one of a public key, a personal key, and a secret key, along with identification information of the device. The drug injector 10 may decode the encoded exclusive controller authentication data and may authenticate the authentication data (230). The drug injector 10 may also generate and encode signature information including a feature value of the device and encoding data of the device (240). When the drug injector 10 sends the encoded signature information to the drug injector controller 20, the drug injector controller 20 may decode the signature information and authenticate the device (250). Through the series of processes, it may be identified that the drug injector 10 and the drug injector controller 20 are connectable to each other.

The drug injector 10 may identify, through the above processes, whether the device sending the connection request through the network communication is the controller designed exclusively for controlling the drug injector, via the identification information. Here, when there is no controller previously connected to the drug injector 10 and it is identified that the device is the controller designed exclusively for controlling the drug injector 10, an exclusive control authority is set between the drug injector 10 and the drug injector controller 20. For example, in this process, when the drug injector controller 20 requests the drug injector 10 to set the data access authority and device control authority, the drug injector 10 may set the data access authority and the device control authority of the exclusive controller that obtains the authentication (260). After that, the drug injector controller 20 may control the drug injector 10 via the network.

When the above bonding is made between the drug injector 10 and the drug injector controller 20, the drug injector controller 20 may register the above device-controller bonding information on the management server 50, and may send the public key of the management server received from the management server 50 to the drug injector 10.

Here, the management server 50 may record device information of the drug injector controller 20, the bonding information of the drug injector-drug injector controller, etc. on a database (DB).

Figure 3:
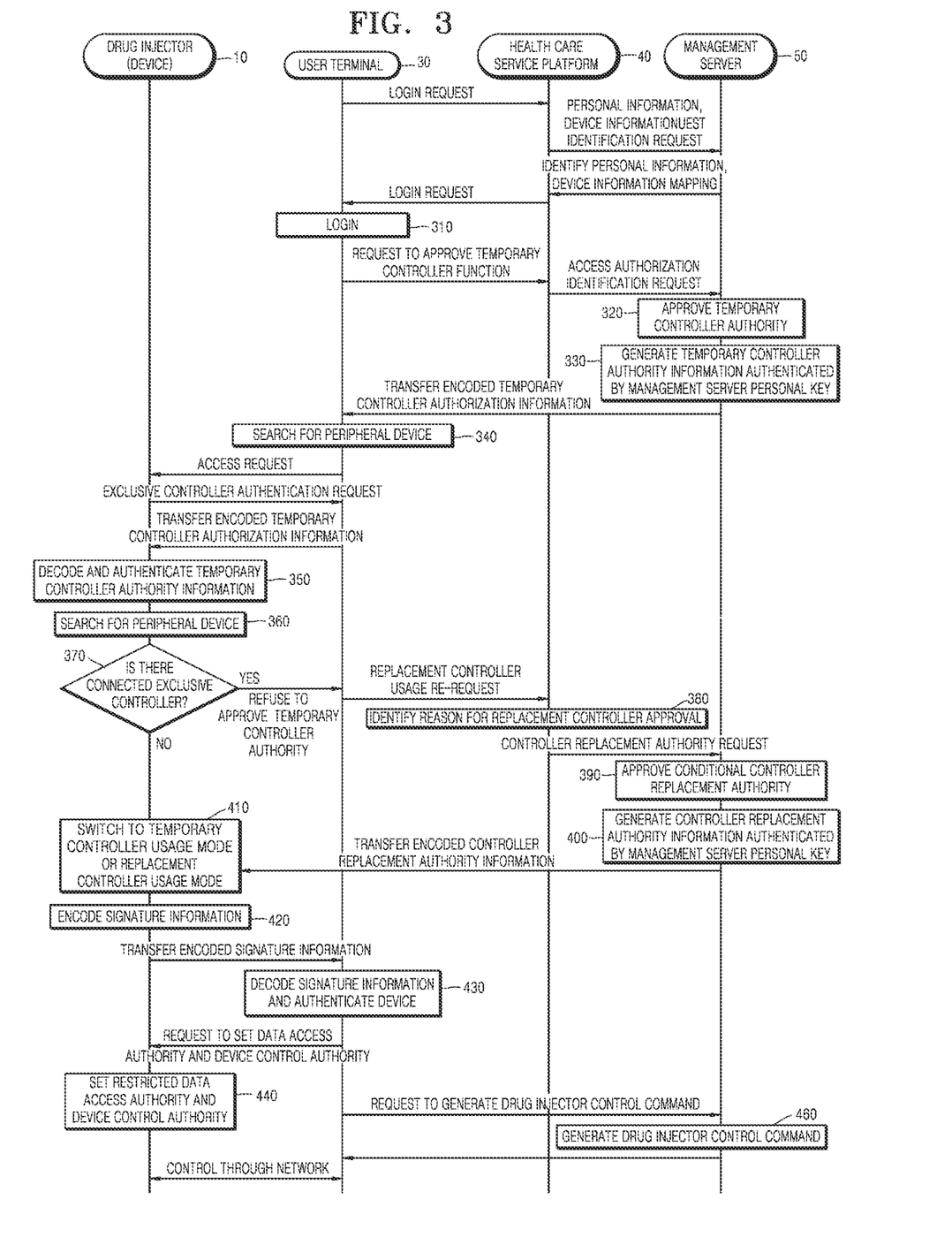
FIG. 3 is a flowchart illustrating a method of controlling a disposable drug injector by using a temporary controller according to another embodiment.

FIG. 3 is a flowchart illustrating a method of controlling a disposable drug injector by using a temporary controller according to another embodiment.

According to an embodiment, the user terminal 30 may function as a temporary controller when there is no exclusive controller for the drug injector. For example, the user terminal 30 may include a smart phone, a wearable device, a PC, a laptop computer, etc., and may include a smart controller (ADM) that is developed exclusively for the drug injector. Otherwise, various kinds of devices may be used, and are collectively referred to as a user terminal or a temporary controller.

According to an embodiment, a diabetes patient may be in a risky situation such as hypoglycemic shock when hypoglycemia condition lasts a long period of time, and thus, cautious observation is necessary. Here, when appropriate drug such as insulin is injected at a right time, the patient's condition may be improved. However, when the exclusive controller of the disposable drug injector may not be in available condition due to the loss, damage, etc. or the user may not easily instruct the operation of the exclusive controller even when the exclusive controller is connected to the disposable drug injector. Here, a temporary controller for controlling the drug injector 10 is necessary. However, the temporary controller temporarily obtains the authority to access the information usage, and thus, limited data accessing authority and device controlling authority may be set through following processes.

Referring to FIG. 3, the user terminal 30 may be provided with personal-customized medical service via the health care service platform 40. For example, the health care service platform 40 may track the blood glucose condition of the user based on numerical values sent from a blood glucose meter of a diabetic patient, and based on that, a bolus appropriate for the current user may be calculated. Here, the bolus denotes insulin that is injected to adjust a blood glucose level to a target normal blood glucose level, when the patient eats meals or snacks or a high blood glucose level is shown regardless of food intake. Also, the bolus insulin denotes a method of injecting insulin that is additionally injected in addition to a basic injection.

The user may agree to use personal information when signing up to use the service provided from the health care service platform 40, and when the user does not agree, the use of the service may be partially restricted.

Referring to FIG. 3, the user terminal 30 may send a login request to the health care service platform 40. The health care service platform 40 may request the management server 50 to check personal information and device information in order to identify the login information of the user, and the management server may identify mapped personal information and device information by comparing the information with the data stored in the DB. Then, the health care service platform 40 may approve the login of the user terminal, and then, a primary authentication with respect to the user terminal is performed.

The user terminal 30 may request the health care service platform 40 to approve the temporary controller role after login (310), and the health care service platform 40 may request the management server 50 to identify access authorization. Here, according to an embodiment, the management server 50 may approve the controller to be authorized as the temporary controller (320), and may generate temporary controller authorization information authenticated by the personal key of the management server (330).

The management server 50 may have DB of personal information of the user registered by the user terminal when signing up, device information of the drug injector, the exclusive controller, etc. registered by the user, personal medical information such as drug injection information prescribed or suggested by a medical institution, etc. In addition to the above information, access information of the registered user and the device may be classified as sensitive information.

The management server 50 may approve/refuse the user terminal to function as a temporary controller, according to a set standard and security policy.

In addition, even when the user bonds the drug injector 10 to the exclusive controller, the user may not use the exclusive controller occasionally. For example, the exclusive controller may need to be replaced due to the loss, damage, errors, etc., or the exclusive controller may not be temporarily found in the vicinity even when the exclusive controller normally operates.

Here, the user may feel convenience when using the health care service platform 40, provided that the user may control the drug injector 10 by using the user terminal 30.

When the user terminal 30 is authorized as the temporary controller from the health care service platform 40 (or management server 50), the user terminal 30 may search for a nearby device (340) and may send a connection request to the drug injector 10. Then, the drug injector 10 may send the exclusive controller authentication request, and then, the user terminal 30 may transfer to the drug injector 10 the encoded temporary controller authorization information received from the health care service platform 40 (or management server 50).

The drug injector 10 may decode the temporary controller authorization information and may authenticate the user terminal 30 as the temporary controller (350). Here, because an issue in the information security and the possibility of hacking may not be excluded, the drug injector 10 may perform an additional verification as to whether there is an exclusive controller that is previously connected in the vicinity thereof (370).

For example, the drug injector 10 may check whether there is an exclusive controller connected thereto around through a peripheral device searching (360) after authenticating the temporary controller. Here, when there is the exclusive controller previously connected, the drug injector 10 may refuse to approve the temporary controller authorization request from the user terminal 30. In this case, the user terminal 30 may request again the health care service platform 40 to use a replacement controller. When a reason for approving the replacement controller determined in advance by the health care service platform 40 is confirmed (380), the management server may approve a conditional controller replacement authority (390). In addition, controller replacement authority information authenticated by the personal key of the management server 50 may be generated and transmitted after being encoded. The encoded controller replacement authority information generated herein may be transferred to the user terminal 30 and to the drug injector 10 via the health care service platform 40. Here, in the controller replacement authority information, a duration of using the controller, the number of usage times, and a controllable range, etc. may be set restrictively.

When receiving the encoded controller replacement authority information, the drug injector 10 may decode the information. In addition, the drug injector 10 may switch to a temporary controller usage mode or a replacement controller usage mode according to the controller replacement authority information (410).

When the user terminal undergoes the authentication through the above processes, the drug injector 10 may encode the signature information thereof (420) and may transmit the encoded information to the user terminal.

The user terminal 300 may decode the signature information received from the drug injector 10 and may authenticate the device (430). After that, the user terminal 30 may request the drug injector 10 to set the data access authority and device control authority, and the drug injector 10 may set the restricted data access authority and the device control authority (440).

According to an embodiment, the restricted device authority may be implemented in the form, in which a control command for each case is received through the health care service platform 40 and then transferred to the drug injector to control the device, not in the form in which the user terminal 30 directly executes a command for controlling the drug injector 10.

For example, when the user thinks that the drug injection through the drug injector 10 is necessary, the user terminal 30 may request the health care service platform 40 to generate a command for controlling the drug injector. The health care service platform 40 transfers the request to the management server 50, and the management server 50 may determine the appropriateness of the control command through a personal-customized health care service model and may generate a command for controlling the drug injector (460). The user terminal 30 may receive the control command generated by the management server through the health care service platform 40, and may transfer the control command to the drug injector 10 to control the drug injector.

Figure 4:
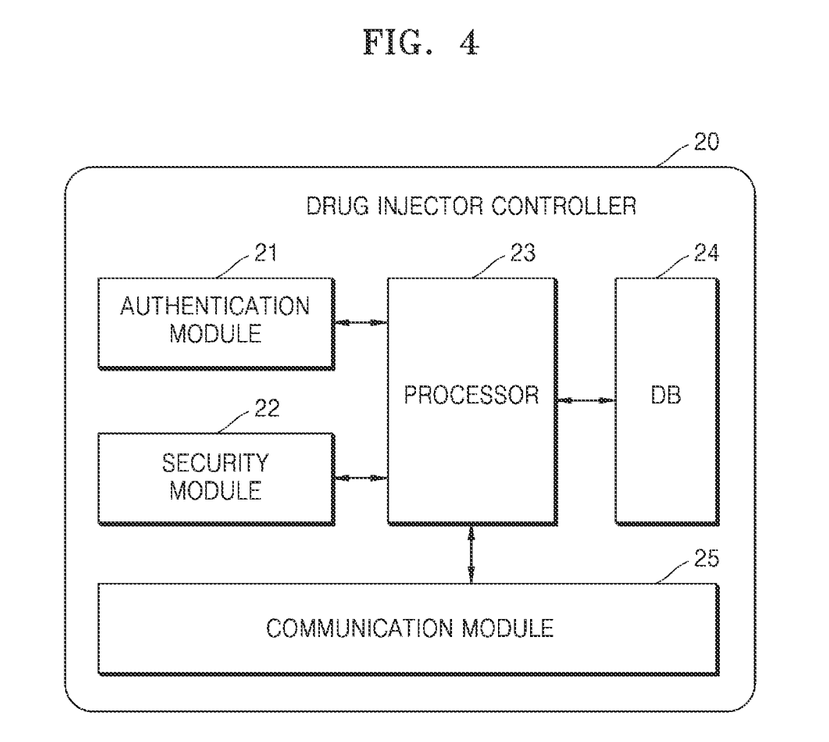
FIG. 4 is a block diagram of a drug injector controller according to an embodiment.

FIG. 4 is a block diagram of a drug injector controller according to an embodiment.

Referring to FIG. 4, the drug injector controller 20 may include an authentication module 21, a security module 22, a processor 23, a DB 24, and a communication module 25. The above example is a minimum configuration for implementing the embodiment of the present disclosure, and additional structures may be added as necessary.

The authentication module 21 checks a serial number and a kind of the drug injector, and may authenticate whether the drug injector may be controllable via the drug injector controller 20. For example, the authentication module 21 generates authentication data that may authenticate the drug injector exclusive controller so that the drug injector controller 20 may be authenticated by another device, and may authenticate another device sending signature information by checking the signature information received from another device. For example, the authentication module 21 may authenticate a connectable status of the drug injector 10 by using an encryption key attached by the drug injector 10 for information security, as well as a basic IP address and a property value of the drug injector 10.

The security module 22 may encode data to be transferred when sending/receiving data via the communication module 25, and may perform an operation of decoding the received data, etc.

The processor 23 may support a device search mode in which a nearby device is searched for in order to connect the disposable drug injector. Also, the processor 23 may perform setting of the data access authority and device control authority about the authenticated device, and control of the authorized device.

The communication module 25 may perform a wireless network communication, and may be connected through wires as necessary. Alternatively, a communication through a mobile communication method may be supported in another embodiment.

Figure 5:
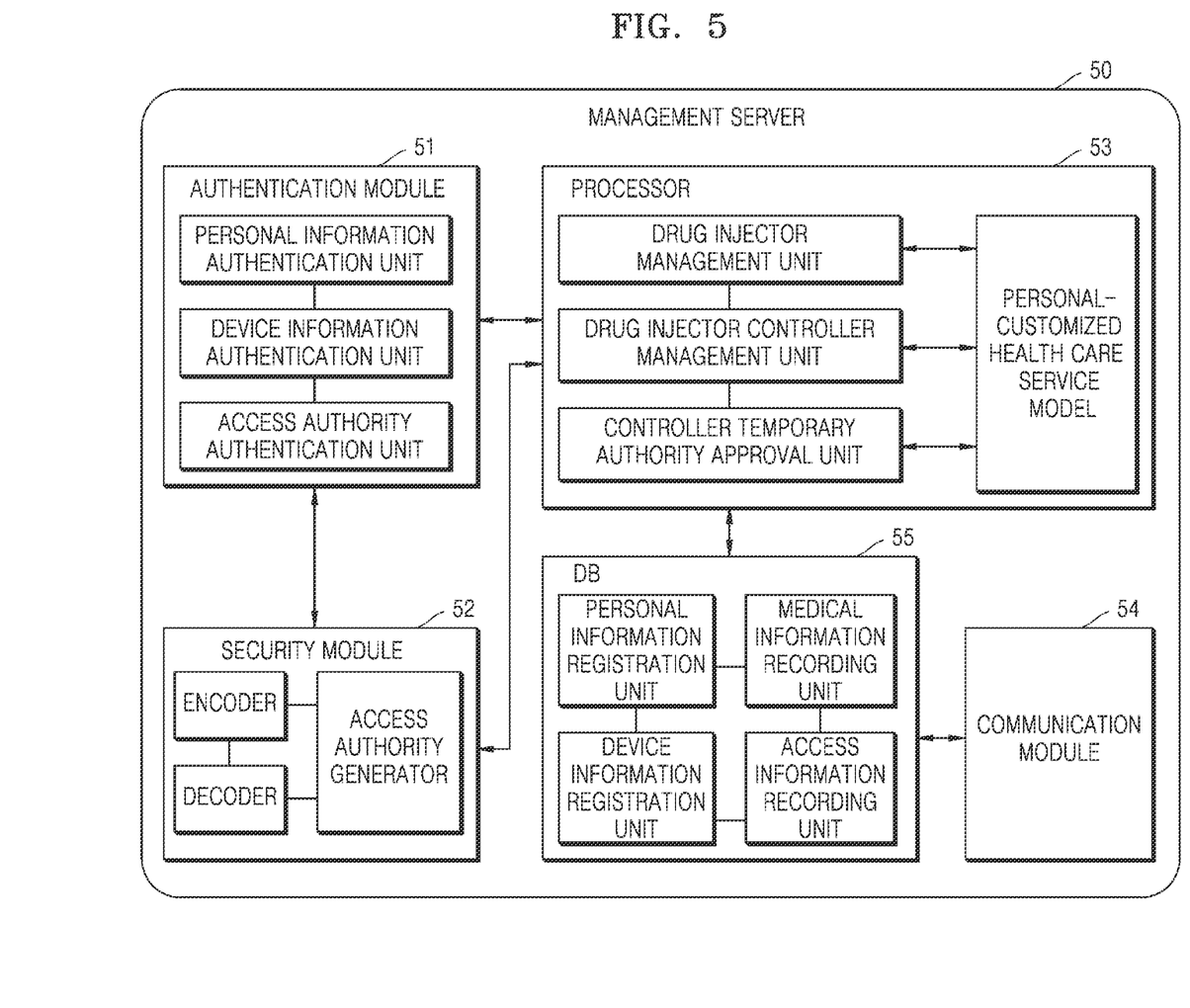
FIG. 5 is a block diagram of a management server for managing a health care service platform according to another embodiment.

FIG. 5 is a block diagram of the management server 50 for managing the health care service platform 40 according to another embodiment.

Referring to FIG. 5, the management server 50 may include an authentication module 51, a security module 52, a processor 53, a communication module 54, and a DB 55.

For example, the authentication module 51 may include a personal information authentication unit, a device information authentication unit, an access authority authentication unit, etc. as detailed structures. Accordingly, the authentication module may authenticate the personal information and the device information, and may authenticate the authority for accessing requested data.

The security module 52 encodes or decodes transmitted/received data, and may set the data accessing authority according to the data classification system.

The processor 53 may manage the drug injector exclusive controller and may approve the temporary usage authority of the controller, based on the personal-customized health care service model. Here, the processor 53 may be configured to include a drug injector management unit, a drug injector controller management unit, a controller temporary authority approval unit, etc.

The communication module 54 may perform wired/wireless network communication.

The DB 55 may register or record the personal information, the device information, the medical information, the access information, etc. that are registered and recorded via the health care service platform 40.

The various embodiments of the present disclosure may be implemented as software (e.g., program) including one or more instructions stored in a storage medium that may be readable by a machine. For example, the processor of the machine may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Here, the term 'non-transitory' simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, the method according to various embodiments disclosed in the present disclosure may be provided to be included in a computer program product. The computer program product may be traded between a seller and a buyer as a product. The computer program product may be distributed in the form of a machine-readable storage medium e.g., compact disc read only memory (CD-ROM)), or be distributed (e.g., downloaded or uploaded) online via an application store (e.g., PlayStore™), or between two user devices directly. If distributed online, at least part of the computer program product may be temporarily generated or at least temporarily stored in the machine-readable storage medium, such as memory of the manufacturer's server, a server of the application store, or a relay server.

a tangible device, and does not include a signal (e.g., an electromagnetic wave), but this term does not differentiate between where data is semi-permanently stored in the storage medium and where the data is temporarily stored in the storage medium.

According to an embodiment, the method according to various embodiments disclosed in the present disclosure may be provided to be included in a computer program product. The computer program product may be traded between a seller and a buyer as a product. The computer program product may be distributed in the form of a machine-readable storage medium e.g., compact disc read only memory (CD-ROM)), or be distributed (e.g., downloaded or uploaded) online via an application store (e.g., PlayStore™), or between two user devices directly. If distributed online, at least part of the computer program product may be temporarily generated or at least temporarily stored in the machine-readable storage medium, such as memory of the manufacturer's server, a server of the application store, or a relay server.

In addition, the terms such as " . . . unit", etc. provided herein may be realized by a hardware component such as a processor or a circuit, and/or a software component executed via a hardware component such as a processor.

The scope of the disclosure is defined by the following claims rather than by the detailed description of the embodiment. It shall be understood that all modifications and embodiments conceived from the meaning and scope of the claims and their equivalents are included in the scope of the disclosure.

The invention claimed is:

1. A method of controlling a disposable drug injector, the method comprising:
searching for a nearby device for connecting to a disposable drug injector;
authenticating that a found device is the disposable drug injector that is controllable by a drug injector controller;
requesting, from the disposable drug injector, to set a data accessing authority and a device controlling authority; and
controlling the disposable drug injector in which the data accessing authority and the device controlling authority are set via network communication,
wherein the drug injector controller comprises:
a communication module performing wireless network communication;
a security module encoding or decoding data transmitted/received through the communication module;
an authentication module generating exclusive controller authentication data, and authenticating a device sending signature information by checking the signature information received from another device; and
a processor configured to support a device searching mode in which a nearby device is searched for in order to connect to the disposable drug injector, and to perform settings of the data accessing authority and the device controlling authority with respect to the authenticated device and control of the device that is authorized.

2. The method of claim 1, wherein the authenticating of that the found device is the disposable drug injector controllable by the drug injector controller comprises:
   encoding exclusive controller authentication data and transmitting the encoded exclusive controller authentication data to the found device;
   receiving encoded signature information from the found device; and
   decoding and authenticating the encoded signature information.

3. The method of claim 2, wherein the encoded signature information includes
   a feature value of the disposable drug injector, and one or more encryption keys from a personal key, a public key, and a secret key for security authentication.

4. The method of claim 1, wherein the requesting of a setting of the data accessing authority and the device controlling authority from the disposable drug injector comprises
   except for an exceptional control through a management server, an exclusive authority to control one or more of sensing data, drug injection time, an injection amount, and drug injection history of the disposable drug injector to the drug injector controller.

5. The method of claim 4, further comprising:
   transferring, to the management server, information notifying that the drug injector controller is bonded to the disposable drug injector as an exclusive controller; and
   transferring, to the disposable drug injector, a management server public key received from the management server.

6. The method of claim 1, further comprising:
   logging-in, performed by a user terminal, to a health care service platform;
   approving, performed by a management server, a drug injector temporary control authority requested by a temporary controller, and generating temporary controller authority information that is authenticated by a personal key of the management server;
   sending, performed by the user terminal, an access request to the disposable drug injector based on the temporary controller authority information;
   searching for, performed by the disposable drug injector, the drug injector controller connected thereto in vicinity, and if the drug injector controller is absent, switching to a temporary controller usage mode or a replacement controller usage mode according to a search result;
   requesting, performed by the user terminal, to generate a command for controlling the disposable drug injector via the health care service platform;
   checking, performed by the management server, the command for controlling the disposable drug injector transmitted from the user terminal by using a personal-customized health care service model, and generating an appropriate command for controlling the drug injector; and
   controlling, performed by the user terminal, the disposable drug injector by using the command for controlling the disposable drug injector received from the management server.

7. The method of claim 6, wherein the management server comprises:
   at least one hardware processor configured for:
   authenticating personal information and device information, and authenticating an accessing authority to requested data;
   encoding or decoding transmitted/received data and setting a data accessing authority according to a data classification system;
   managing the disposable drug injector and the drug injector controller and approving the drug injector temporary control authority based on a personal-customized health care service model; and
   performing a network communication.

\* \* \* \* \*